(12) United States Patent
Chiba et al.

(10) Patent No.: US 7,318,559 B2
(45) Date of Patent: Jan. 15, 2008

(54) TAPE CARTRIDGE

(75) Inventors: Hitomi Chiba, Miyagi (JP); Shuichi Kikuchi, Miyagi (JP); Kazuo Sasaki, Miyagi (JP); Takaaki Sanpei, Miyagi (JP); Mitsue Sakurai, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/541,509

(22) PCT Filed: Jan. 8, 2004

(86) PCT No.: PCT/JP2004/000060

§ 371 (c)(1),
(2), (4) Date: May 10, 2006

(87) PCT Pub. No.: WO2004/064065

PCT Pub. Date: Jul. 29, 2004

(65) Prior Publication Data

US 2006/0237566 A1    Oct. 26, 2006

(30) Foreign Application Priority Data

Jan. 8, 2003    (JP) .............................. 2003-002674

(51) Int. Cl.
G11B 23/107    (2006.01)
(52) U.S. Cl. ................. 242/348.2; 242/332.4
(58) Field of Classification Search ................ 242/345, 242/348, 348.2, 332.4, 586, 586.2, 586.3
See application file for complete search history.

(56) References Cited

U.S. PATENT DOCUMENTS

| | | | | |
|---|---|---|---|---|
| 3,990,733 A | * | 11/1976 | Shiba et al. .............. | 242/586.2 |
| 4,290,562 A | * | 9/1981 | Sasaki et al. ............. | 242/586.2 |
| 4,436,253 A | * | 3/1984 | Watanabe ................. | 242/586.2 |
| 4,456,192 A | * | 6/1984 | Sato et al. ................ | 242/586.2 |
| 4,504,027 A | * | 3/1985 | Okamura et al. ......... | 242/586.2 |
| 4,720,055 A | * | 1/1988 | Satoh et al. .............. | 242/586.2 |
| 4,754,358 A | * | 6/1988 | Oishi ....................... | 242/586.2 |
| 5,205,507 A | * | 4/1993 | Satoh et al. .............. | 242/586.3 |
| 5,261,626 A | | 11/1993 | Hoge et al. | |
| 5,303,875 A | * | 4/1994 | Hoge et al. ............... | 242/348.3 |
| 5,647,551 A | * | 7/1997 | Ikeda et al. .............. | 242/345 |

(Continued)

FOREIGN PATENT DOCUMENTS

JP    63-53633    10/1988

(Continued)

Primary Examiner—William A Rivera
(74) Attorney, Agent, or Firm—Oblon, Spivak, McClelland, Maier & Neustadt, P.C.

(57) ABSTRACT

A tape cartridge that has a clamp force to a block body and that secures a leader tape to a leader block is provided.

Nail portions (63a, 64a) formed on the outer surface sides of a pair of leg portions (63, 64) of a clamper (36') are secured to securing grooves (53, 54) formed on side walls of a assembling concave portion (50) of a block body (40) to secure the block body (40) and the clamper (36'). At this point, with concave grooves (73, 74) and a reinforcement rib (75) formed on an inner surface side of a base portion (60) that composes the clamper (36') in the elongation direction of the leg portions 63 and 64. Thus, when the clamper (36') is pushed, it can be prevented from being damaged and a desired clamp force can be obtained.

5 Claims, 17 Drawing Sheets

U.S. PATENT DOCUMENTS 5,850,985 A * 12/1998 Higuchi et al. .......... 242/586.2
2003/0111570 A1 * 6/2003 Brown et al. ............ 242/348.2

FOREIGN PATENT DOCUMENTS

| JP | 115380/1992 | 10/1992 |
| JP | 137579/1992 | 12/1992 |
| JP | 6-259923 | 9/1994 |
| JP | 6-290567 | 10/1994 |
| JP | 7-506925 | 7/1995 |
| JP | 8-147803 | 6/1996 |

* cited by examiner

TAPE CARTRIDGE

TECHNICAL FIELD

The present invention relates to a tape cartridge that rotatably houses in a cartridge case a tape reel that winds a magnetic tape, in particular, to a tape cartridge of which a leader block as a tape leader is connected to one end of the tape.

BACKGROUND ART

A tape drive that pulls a magnetic tape out of a tape cartridge that houses a single tape reel on which the magnetic tape, which is a tape-shaped recording medium, is wound, and records and reproduces information to and from the magnetic tape is known. The tape drive of this type is mainly used to back up a large amount of data with which for example a computer server and so forth deal.

Many types of tape cartridges are known. In one of these tape cartridges, a leader block connected to one end of a magnetic tape is housed in a cartridge case. When the tape cartridge, which has a leader block, is loaded to a tape drive device, the leader block is chucked by a chucking mechanism, pulled out of the tape cartridge by a conveying mechanism, and conveyed to a take-up reel of the tape drive device. While the magnetic tape pulled out of the tape cartridge is being wound up on a take-up reel of the tape drive device, information is recorded or reproduced to or from the magnetic tape by a magnetic head of the tape drive device.

The tape is connected to the leader block by clamping a block body with a pin or by clamping a block body and a cover as described in for example the following patent document 1 (Japanese Patent Application Publication No. HEI 6-290567).

FIG. 19A to FIG. 20B show the state of which a tape is connected to a leader block described in the patent document 1. In FIG. 19A and FIG. 19B, one end of a tape 103 is secured to a block body 101 of the leader block with a securing pin 102. FIGS. 20A and 20B show a state of which one end of the tape 103 is secured with a cover 106 hinged to the block body 105.

In any of these examples, the securing pin 102 or an edge portion 108 of the cover 106 is press-fit to a concave portion 104 or 107 formed on the block body 101 or 105 and one end of the tape 103 is clamped therebetween.

The block body, which composes the leader block, and a clamp member, which is the securing pin or the cover, may be normally made of an injection molded member of a synthetic rein material. Thus, in the foregoing patent document 1 of which the tape is secured by press-fitting the clamp member to the concave portion of the block body, the block body or clamp member creep-deforms under high temperature and/or high humidity environment, causing clamp force for the tape to weaken.

If the clamp force of the clamp member to the tape weakens, the leader block and the tape may be misaligned or the tape may be separated from the leader block. If the leader block and the tape guide are misaligned, while the tape is being traveled, the tape may be brought in contact with a flange of a tape guide disposed inside the tape drive device. As a result, the tape edge may be damaged and the reliability of the recording and reproducing operation for information will be deteriorated.

On the other hand, when the clamp member is press-fit to the block body, a technique of which the block body is secured to a dedicated tool and the clamp member is pressed to the block body is used. In this case, the pushing force acting on the clamp member damages it. As a result, a desired clamp force may not be obtained.

The present invention is made from the foregoing point of view. An issue of the present invention is to ensure the clamp force of the clamp member to the block body to secure the tape to the leader block.

DISCLOSURE OF THE INVENTION

To solve the foregoing issue, a clamp member of a tape cartridge of the present invention has a base portion that is press-fit to a concave portion formed on a side surface portion of a block body to form a part of the side surface portion of the block body, a pair of leg portions that are formed on inner surface sides of the base portion in the direction of the width of the tape, and nail portions that are formed on outer surface sides of the pair of leg portions and that are secured to securing grooves formed in side walls of the concave portion.

According to the present invention, nail portions formed on outer surface sides of a pair of led portions of a clamp member are fit to fitting grooves formed in concave side walls of a concave portion of a block body to secure the block body and the clamp member. With the clamping operation of the clamp member to the block body, the clamp force to the tape can be prevented from lowering in comparison with the conventional press-fit operation. As a result, a desired clamp force is obtained and the tape is secured to the leader block.

Preferably, the length of a pair of leg portions of the clamp member is larger than the width of the tape. Thus, the press-fit force of the clamp member to the block body is increased and the clamp force drop prevention function can be more improved.

In addition, concave grooves are formed on an inner surface side of a base portion of the clamp member in the elongation direction of a pair of leg portions. Thus, when nail portions disposed on the outer surfaces of the leg portions are secured to the securing grooves, the leg portions are more elastically deformed. As a result, when the clamp member is pressed, it can be prevented from being damaged.

BEST MODE FOR CARRYING OUT THE INVENTION

Next, with reference to the accompanying drawings, embodiments of the present invention will be described. In these embodiments, the present invention is applied to a magnetic tape cartridge for a data storage.

FIRST EMBODIMENT

Figure 1:
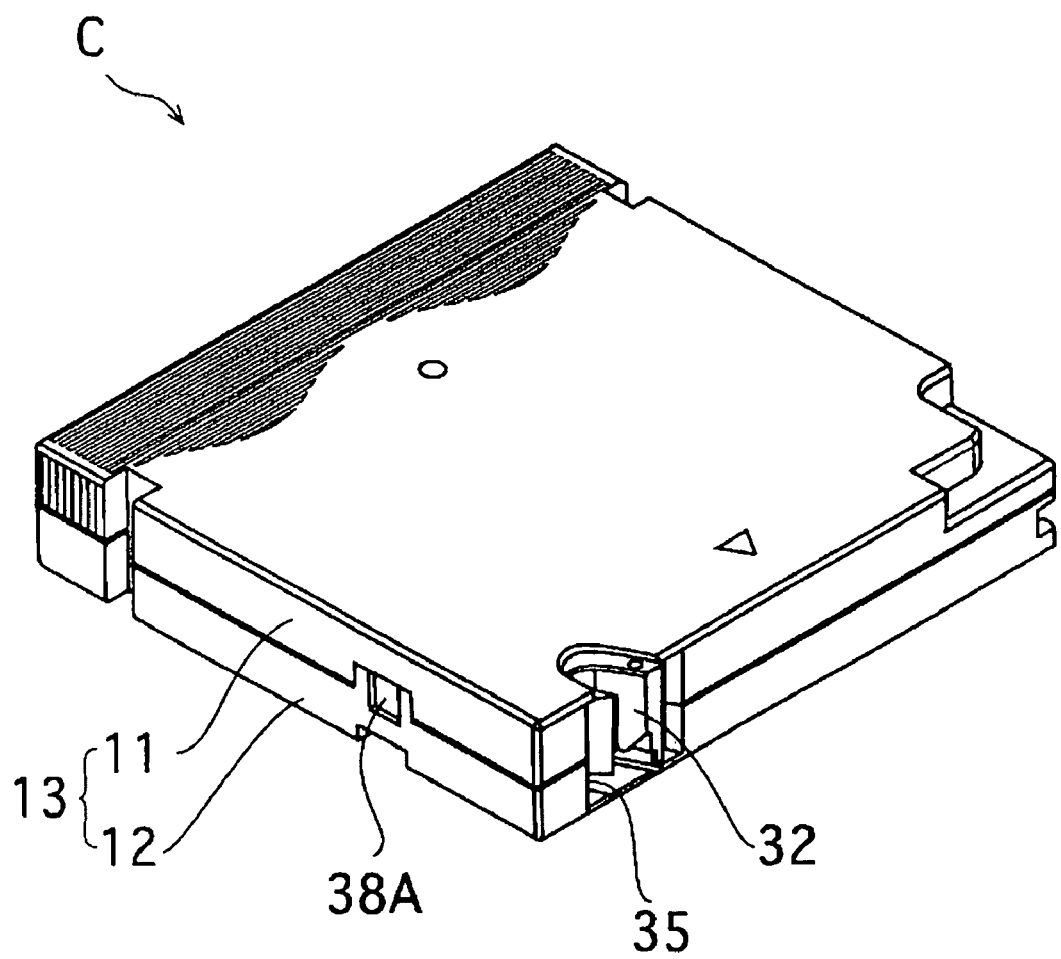
FIG. 1 is an overall perspective view showing a tape cartridge C according to a first embodiment of the present invention.
Figure 2:
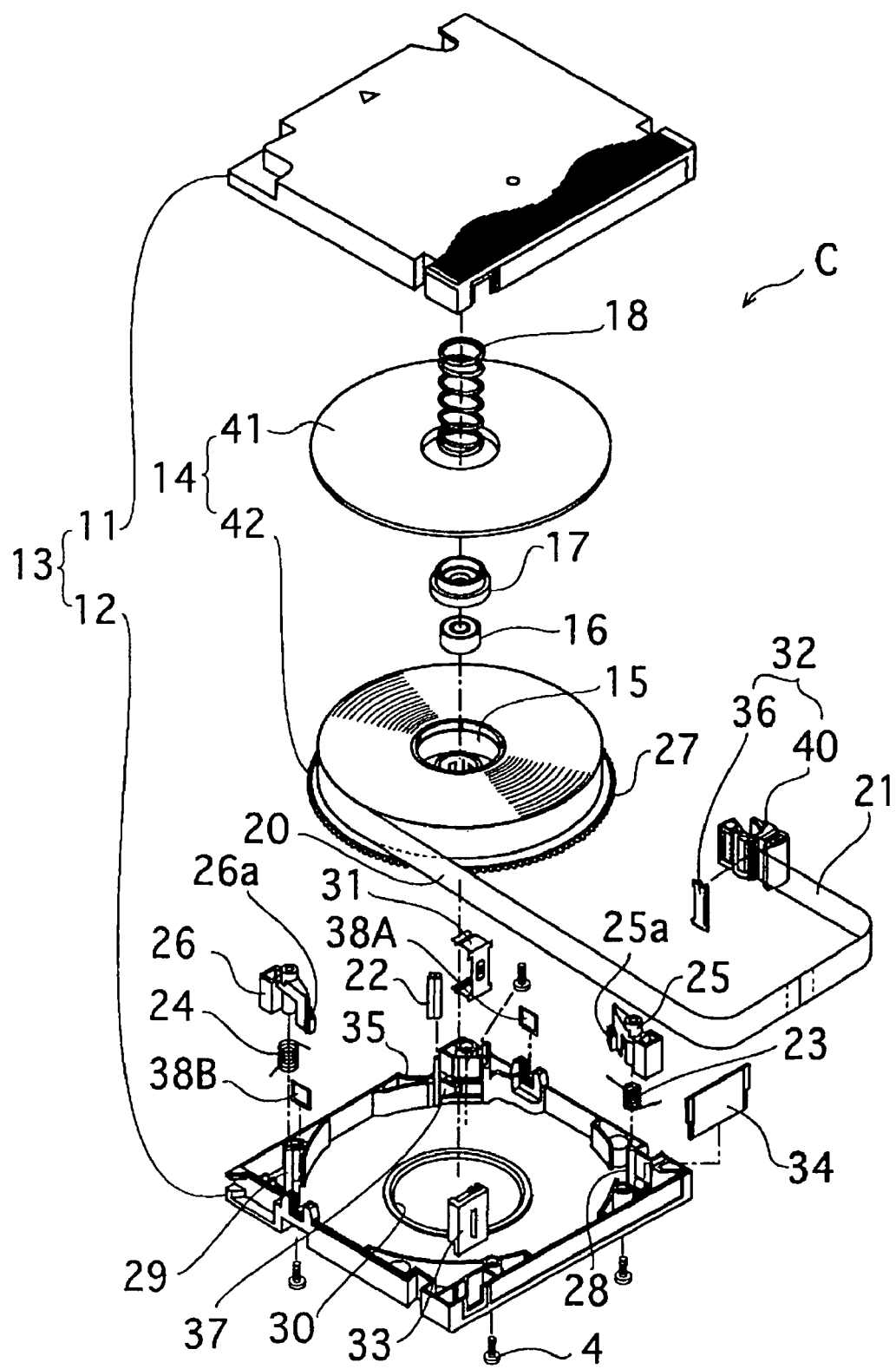
FIG. 2 is an exploded perspective view of the tape cartridge C seen from the rear.
Figure 3:
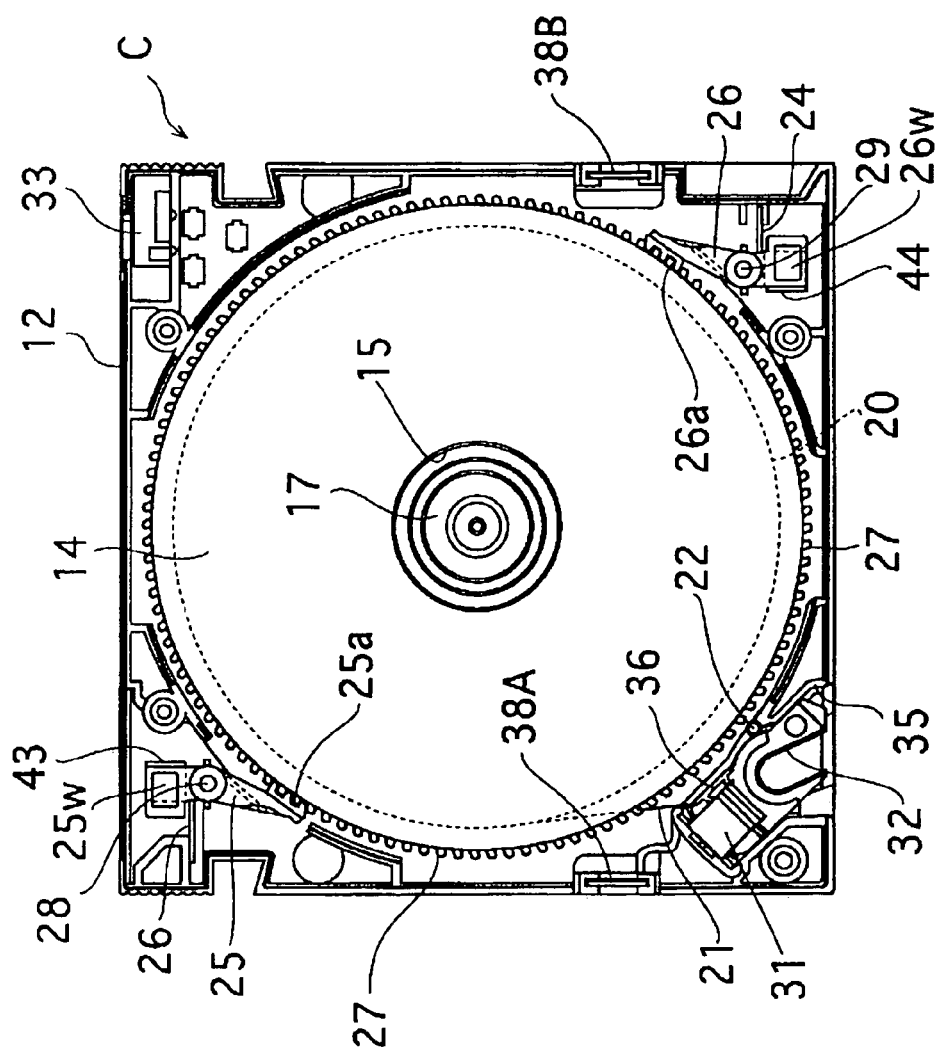
FIG. 3 is a plan view showing an internal structure of the tape cartridge C, an upper shell being removed therefrom.

FIG. 1 to FIG. 3 show a tape cartridge C according to a first embodiment of the present invention. FIG. 1 is an overall perspective view showing the tape cartridge C. FIG. 2 is an exploded perspective view of the tape cartridge C seen from the rear thereof. FIG. 3 is a plan view showing an internal structure of the tape cartridge C, an upper shell having been removed therefrom.

The tape cartridge C of this embodiment has a structure of which a single tape reel 14 is rotatably housed in a cartridge case 13. The tape reel 14 winds a magnetic tape 20. The cartridge case 13 is formed by connecting an upper shell 11 and a lower shell 12 that are made of a synthetic resin material such as polycarbonate resin.

The tape reel 14 is composed of an upper flange 41 and a lower flange 42 that are connected. The lower flange 42 is integrally connected to a reel hub 15. The magnetic tape 20 is wound around the tape reel 14 so that a magnetic surface of the magnetic tape 20 faces inward. A transparent leader tape 21 is connected to one end of the magnetic tape 20. The other end of the leader tape 21 is connected to the tape reel 14. The tape reel 14 has a ring-shaped bearing 16 that is press-fit and secured to the inside of the reel hub 15. The tape reel 14 is pressed toward the lower shell 12 by a reel spring 18 disposed between a bearing cap 17 that covers the bearing 16 and an inner center portion of the upper shell 11. The reel spring 18 is composed of a cylindrical coil spring.

Disposed at a center portion on the lower surface of the tape reel 14 is a chucking gear (not shown) that is engaged with a rotating shaft of the tape drive device. The chucking gear is exposed to the outside through an opening 30 formed at a center portion of the lower shell 12.

When the tape cartridge C is not attached to the tape drive device, namely the tape cartridge C is not used, a pair of reel lock members 25 and 26 tensioned by reel lock springs 23 and 24 prevent the tape reel 14 from rotating. In other words, engagement portions 25a and 25b formed on the reel lock members 25 and 26 are engaged with a reel lock gear 27 formed on an outer periphery of the lower flange 42, the tape reel 14 is prevented from rotating.

The reel lock spring 23 and 24 and the reel lock members 25 and 26 are rotatably mounted on supporting shafts 28 and 29 that vertically protrude on the inner surface of the lower shell 12.

When the tape cartridge C is not used, the magnetic tape 20 has been fully wound up on the tape reel 14. The end portion of the leader tape 21 is connected to the block body 40 of a leader block 32 that blocks a tape exit opening portion 35 in the cartridge case 13 through a clamper 36. The tape exit opening portion 35 is formed on the front surface of the cartridge case 13. The leader block 32 is aligned with a housing portion 37 disposed in the opening portion 35 while the leader block 32 is elastically supported by a nearly "]" shaped leader block spring 31.

In contrast, when the tape cartridge C is attached to the tape drive device, namely, the tape cartridge C is used, as a rotating shaft of the tape drive device is raised, the tape reel 14 is raised to a center position of the cartridge case 13. In addition, reel unlock plugs of the tape drive device are inserted into reel unlock holes 43 and 44. As a result, the reel lock members 25 and 26 are unlocked and the tape reel 14 becomes rotatable. The chucking mechanism of the tape drive device pulls the leader block 32 out of the opening portion 35 so that the magnetic tape 20 appears outside the cartridge case 13.

The tape cartridge C has a safety tab 33 that prevents data from being mistakenly recorded or erased to or from the magnetic tape 20. The safety tab 33 is slidably disposed on a rear surface of the cartridge case 13 opposite to a surface in which the opening portion 35 is formed.

Disposed on a rear inner surface of the cartridge case 13 is a memory board 34 on which a non-contact type IC (semiconductor integrated circuit) memory is mounted. The memory board 34 communicates with the tape drive device to read and write information of for example contents recorded on the magnetic tape 20 from and to the magnetic tape 20.

Disposed in opposite side surfaces of the cartridge case 13 against an inserting direction of the tape cartridge C to the tape drive device are transparent window members 38A and 38B through which the tape end is detected.

Next, with reference to FIG. 4 to FIG. 10, the leader block 32 according to the present invention will be described in detail.

Figure 4:
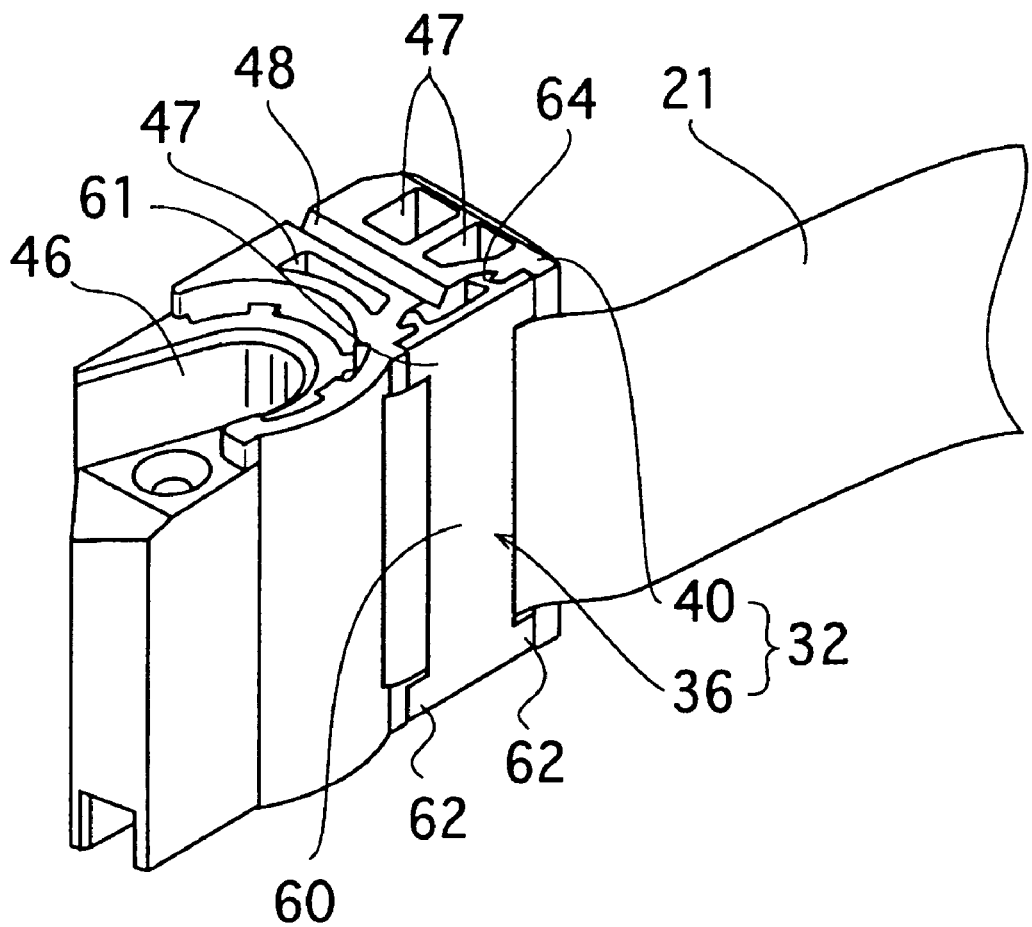
FIG. 4 is a perspective view showing a leader block 32.

FIG. 4 is a perspective view showing the leader block 32. FIG. 5 is a plan view showing the block body 40 that composes the leader block 32, FIG. 5B being a side view thereof, FIG. 5C being a sectional view taken along line [5C]-[5C] of FIG. 5B. FIG. 6A is a side view showing the clamper 36, FIG. 6B being a bottom view thereof. FIG. 7 to FIG. 10 are outlined plan views describing mounting steps of the leader tape 21 and the clamper 36 to the block body 40.

The leader block 32 is composed of the block body 40 and the clamper 36.

The block body 40 is made of an injection molded member of a synthetic rein material such as polyacetal (POM) or the like. As shown in FIG. 4, the height of the block body 40 corresponds to the width of the leader tape 21. The height of the block body 40 is larger than the width of the leader tape 21. Formed at an edge portion of the block body 40 is an almost U letter shaped fitting portion 46 fit to the chucking mechanism (not shown) of the tape drive device. Formed on the upper surface and the lower surface of the block body 40 are fitting grooves 48 and 49 (FIG. 5) fit to leader block springs (FIG. 2 and FIG. 3) secured to the housing portion 37 of the lower shell 12. The block body 40 of this embodiment has a plurality of blank portions 47 to reduce the weight of the block body 40.

Figure 5A:
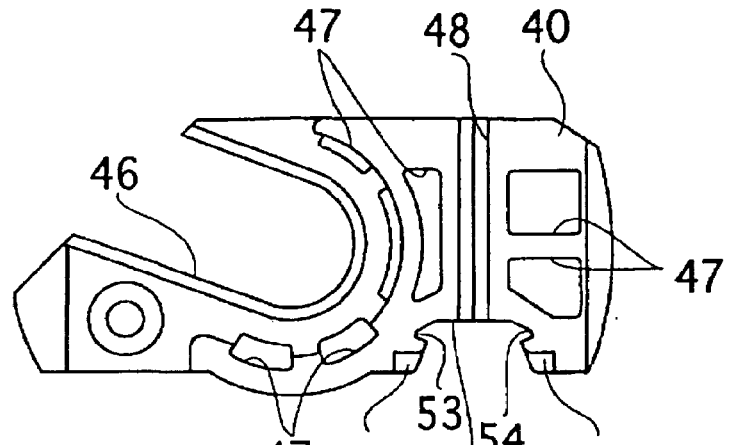
FIG. 5A to FIG. 5C are views showing a block body 40 that composes the leader block 32, FIG. 5A being a plan view thereof, FIG. 5B being a side view thereof, FIG. 5C being a sectional view taken along line [5C]-[5C] of FIG. 5B.
Figure 5B:
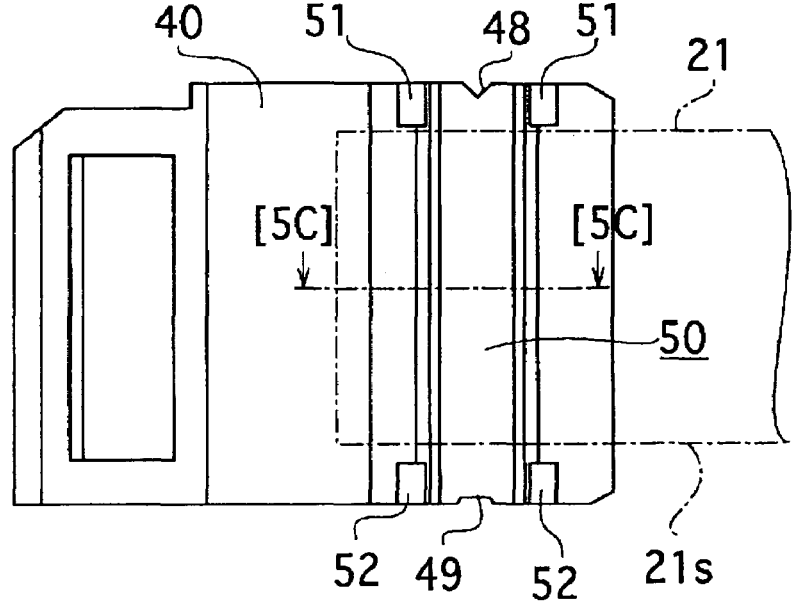
Figure 5C:
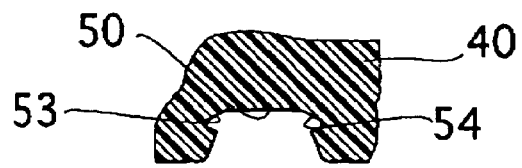
Figure 6A:
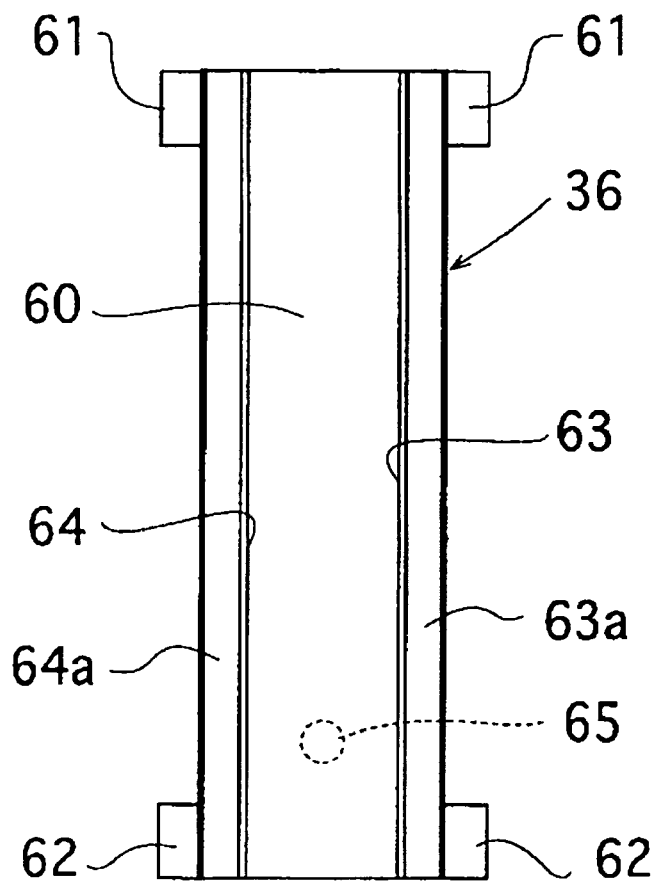
FIG. 6A and FIG. 6B are views showing a clamper 36 that composes a leader block 32, FIG. 6A being a side view thereof, FIG. 6B being a bottom view thereof.
Figure 6B:
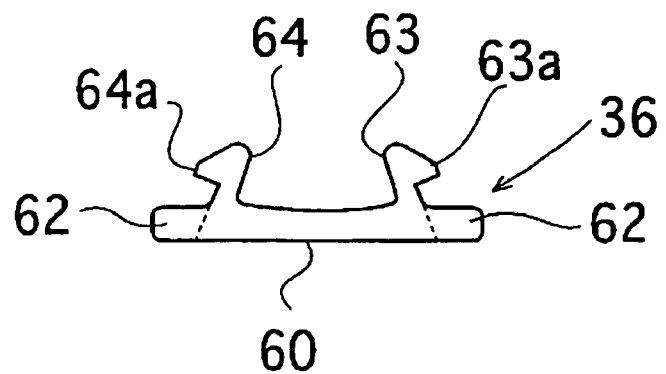

Formed in one side surface portion 40a of the block body 40 is an assembling concave portion 50 in which the clamper 36 is mounted as shown in FIG. 5A to FIG. 5C. The clamper 36 will be described later in detail. The assembling concave portion 50 is fully formed in the height direction of the block body 40. Formed in the side surface portion 40a corresponding to an upper edge portion and a lower edge portion of the assembling concave portion 50 are pairs of concaved restriction portions 51, 51, 52, and 52 that are fit to the clamper 36 and that restrict upper and lower movements of the clamper 36.

Both side wall portions of the assembling concave portion 50 are tapered so that they approach each other in the inward direction of the block body 40. Formed at bottom portions of the concave portion 50 are securing grooves 53 and 54 that secure the clamper 36. The securing grooves 53 and 54 are straightly and continuously formed in nearly the same sectional shape in the elongation direction of the assembling concave portion 50.

Next, the structure of the clamper 36 assembled to the assembling concave portion 50 will be described.

The clamper 36 corresponds to a "clamp member" of the present invention. When the clamper 36 is assembled to the assembling concave portion 50, the leader tape 21 is clamped by the clamper 36 along with the block body 40. The clamper 36 is made of an injection molded member of a synthetic resin material such as polyacetal (POM). The height of the clamper 36 is the same as the height of the block body 40. In FIG. 6A, reference numeral 65 represents a gate position for which the clamper 36 is injection molded.

The clamper 36 is vertically symmetrical. The clamper 36 has a nearly rectangular base portion 60 that composes a part of the side surface portion 40a of the block body 40 when the base portion 60 is press-fit to the assembling concave portion 50; a pair of leg portions 63 and 64 that are formed in the width direction of the leader tape 21 on the inner surfaces of the base portion 60; and nail portions 63a and 64a secured to the securing grooves 53 and 54 formed in the side walls of the assembling concave portion 50 formed on the outer surfaces of the pair of leg portions 63 and 64. The height of the leg portions 63 and 64 is larger than the width of the leader tape 21.

Pairs of tongue portions 61, 61, 62, and 62 that protrude are formed at the upper and lower edge portions of the clamper 36. These tongue portions 61, 61, 62, and 62 are fit to the pairs of restriction portions 51, 51, 52, and 52 formed at the upper and lower edges of the assembling concave portion 50 of the block body 40 to restrict relative upper and lower movements of the clamper 36 against the block body 40. The distance between the upper tongue portions 61 and the lower tongue portions 62 is larger than the width of the leader tape 21.

Next, an operation of this embodiment will be described. The tape cartridge C is manufactured by assembling individual constituent parts to the lower shell 12. With reference to FIG. 2, the pair of reel lock springs 23 and 24 and the pair of reel lock members 25 and 26 are mounted to the supporting shafts 28 and 29, respectively. Next, the tape reel 14, to which the magnetic tape 20 has been wound and to which the leader block 32 and the leader tape 21 have been connected, the safety tab 33, the memory board 34, and the window members 38A and 38B are mounted to the predetermined positions. The leader block 32 is fit to the leader block spring 31 that has been assembled to the lower shell 12. As a result, the leader block has been positioned in the housing portion 37. Last, the upper shell 11 is assembled to the lower shell 12 through the reel spring 18. The upper shell 11 and the lower shell 12 are connected with a plurality of screw members 4.

The leader tape 21 is connected to the leader block 32 in the following manner.

Figure 7:
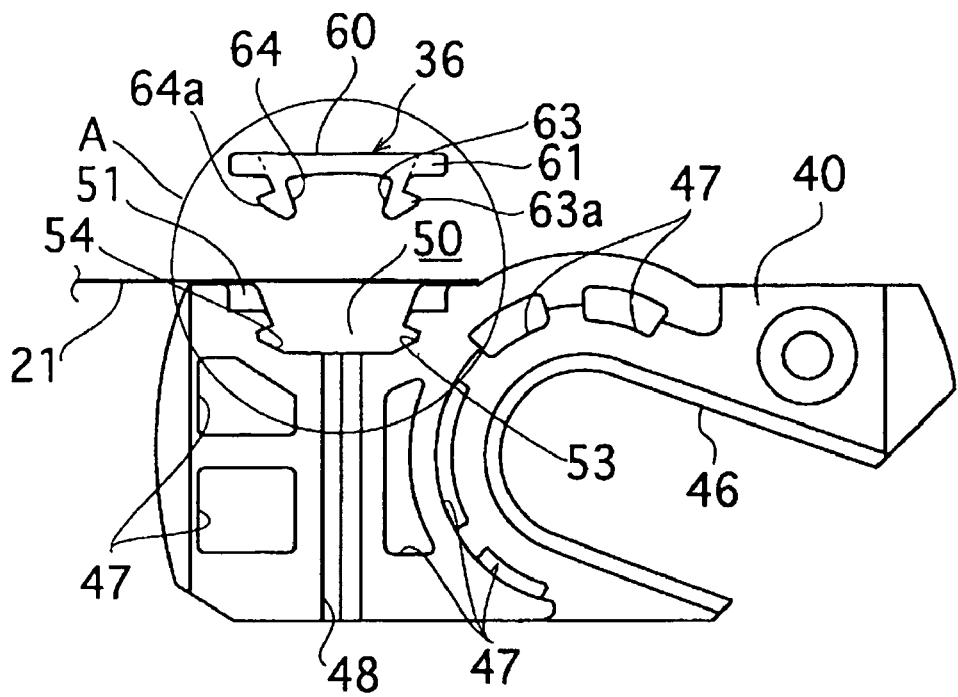
FIG. 7 is an outlined plan view describing a mounting step of a leader tape 21 and the clamper 36 to the block body 40.
Figure 8:
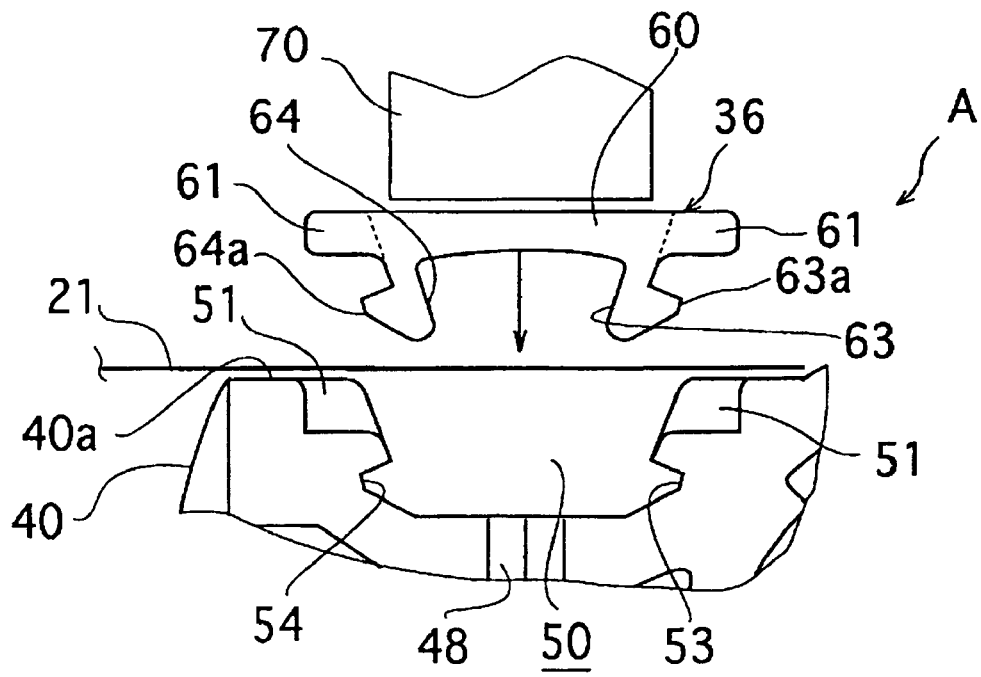
FIG. 8 is an outlined plan view describing a mounting step of the leader tape 21 and the clamper 36 to the block body 40.

As shown in FIG. 7 and FIG. 8, the leader tape 21 is aligned with the side surface portion 40a of the block body 40. Thereafter, the clamper 36 is located so that the pair of leg portions 63 and 64 face the assembling concave portion 50. With a pushing jig 70 of an automatic clamping device, the clamper 36 is press-fit to the assembling concave portion 50 through the leader tape 21.

Figure 9:
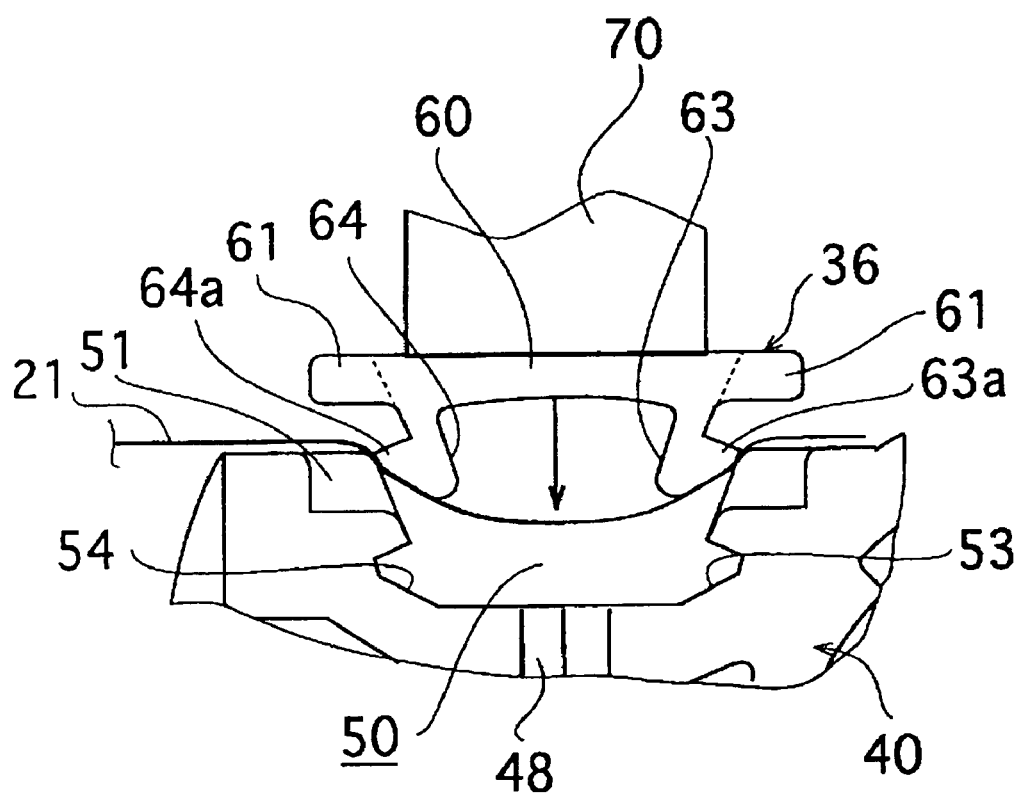
FIG. 9 is an outlined plan view describing a mounting step of the leader tape 21 and the clamper 36 to the block body 40.
Figure 10:
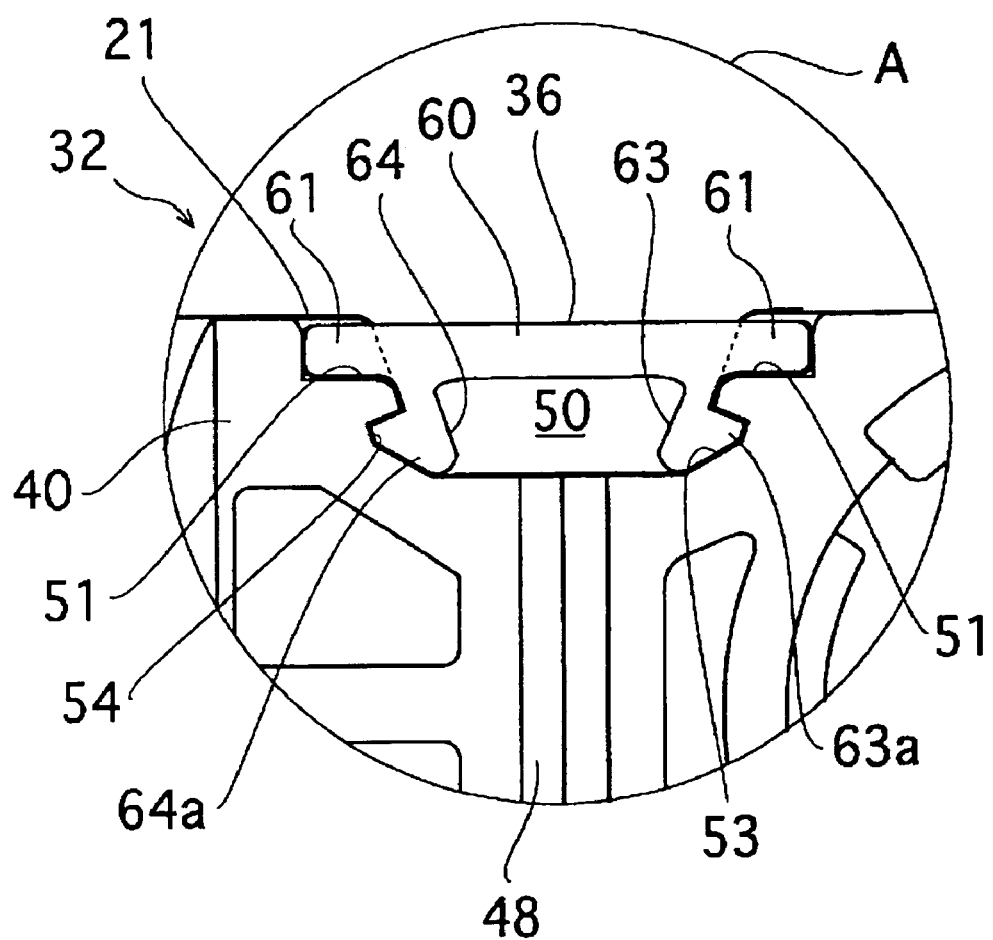
FIG. 10 is an outlined plan view showing a state that the mounting step of the leader tape 21 and the clamper 36 to the block body 40 has been completed.

At the press-fitting step for the clamper 36, the outer surface of the base portion 60 of the clamper 36 is pressed by the pushing jig 70. Thus, as shown in FIG. 9, the nail portions 63a and 64a of the pair of leg portions 63 and 64 are elastically deformed in the direction that the nail portions 63a and 64a approach each other along both the wall surfaces of the assembling concave portion 50. Finally, as shown in FIG. 10, the nail portions 63a and 64a are secured to the securing grooves 53 and 54 through the side walls of the assembling concave portion 50.

According to this embodiment, when the block body 40 and the clamper 36 are secured, the nail portions 63a and 64a formed on the pair of leg portions 63 and 64 of the clamper 36 are secured to the securing grooves 53 and 54 of the assembling concave portion 50. Thus, the clamp force of the leader tape can be prevented from lowering in comparison with the conventional press-fitting method. In addition, with a desired clamp force, the leader tape 21 can be secured to the leader block 32. Thus, the leader tape 21 can be prevented from being misaligned to the leader block 32.

In addition, since the height of the pair of leg portions 63 and 64 of the clamper 36 is larger than the width of the leader tape 21, the securing force of the clamper 36 to the block body 40 can be increased. Thus, the clamp force drop prevention function can be more improved.

At the foregoing connecting step for the leader tape 21 to the leader block 32, when the block body 40 and the leader tape 21 are aligned, it is assumed that a dedicated jig that causes the elongation direction of the leader tape 21 and the forward and backward directions of the block body 40 to be automatically aligned is used.

Alternatively, even if the foregoing dedicated jig is used, of course, the block body 40 can have a function that aligns the block body 40 and the leader tape 21.

Figure 11A:
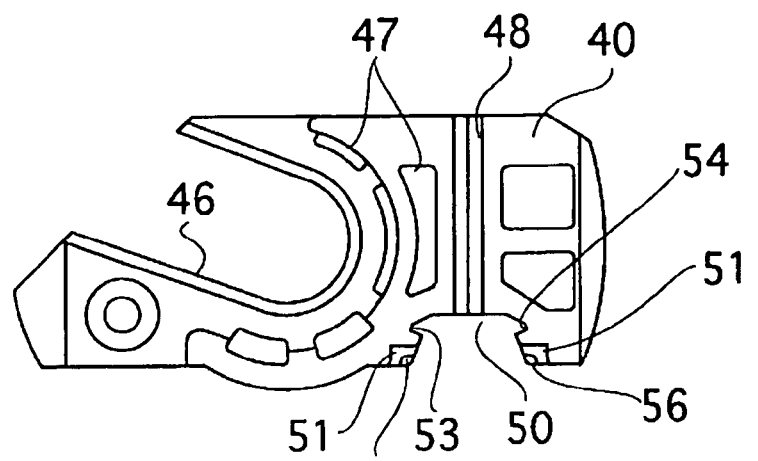
FIG. 11A to FIG. 11C are views showing a modification example of the structure of the block body 40, FIG. 11A being a plan view thereof, FIG. 11B being a side view thereof, FIG. 11C being a sectional view taken along line [11C]-[11C] of FIG. 11B.
Figure 11B:
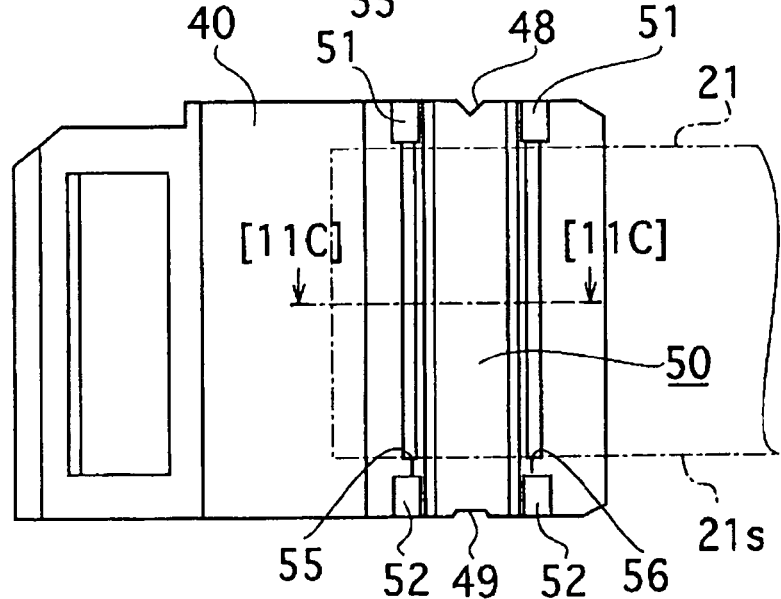
Figure 11C:
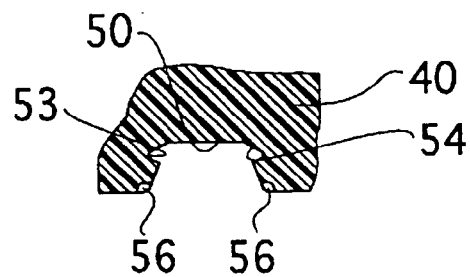

FIG. 11A to FIG. 11C show an example of this structure. In FIG. 11A to FIG. 11C, elements similar to those in FIG. 5A to FIG. 5C are denoted by similar reference numerals.

The assembling concave portion 50 is formed in the side surface portion 40a of the block body 40. Disposed on the side surface portion 40a are guide portions 55 and 56 that align the leader tape 21 with the block body 40. The guide portions 55 and 56 are made of staged portions of which opening edge portions of the assembling concave portion 50 are partly cut. As shown in FIG. 11B, the guide portions 55 and 56 have an alignment function of which they are brought in contact with edge portions 21s of the leader tape 21. As a result, the elongation direction of the leader tape 21 is aligned with the forward and backward directions of the block body 40.

As shown in the drawing, the guide portions 55 and 56 may not need to be formed at tow positions through the assembling concave portion 50. One of the guide portions 55 and 56 may be omitted.

At the connecting step for the leader tape 21 to the leader block 32 with the clamper 36, as described above, the press-fitting operation is performed with the pushing jig 70. When the nail portions 63a and 64a of the clamper 36 of the base portion 60 are press-fit to the assembling concave portion 50 through the side walls thereof, a pushing force of the pushing jig 70 may damage the plate-shaped base portion 60.

Figure 12:
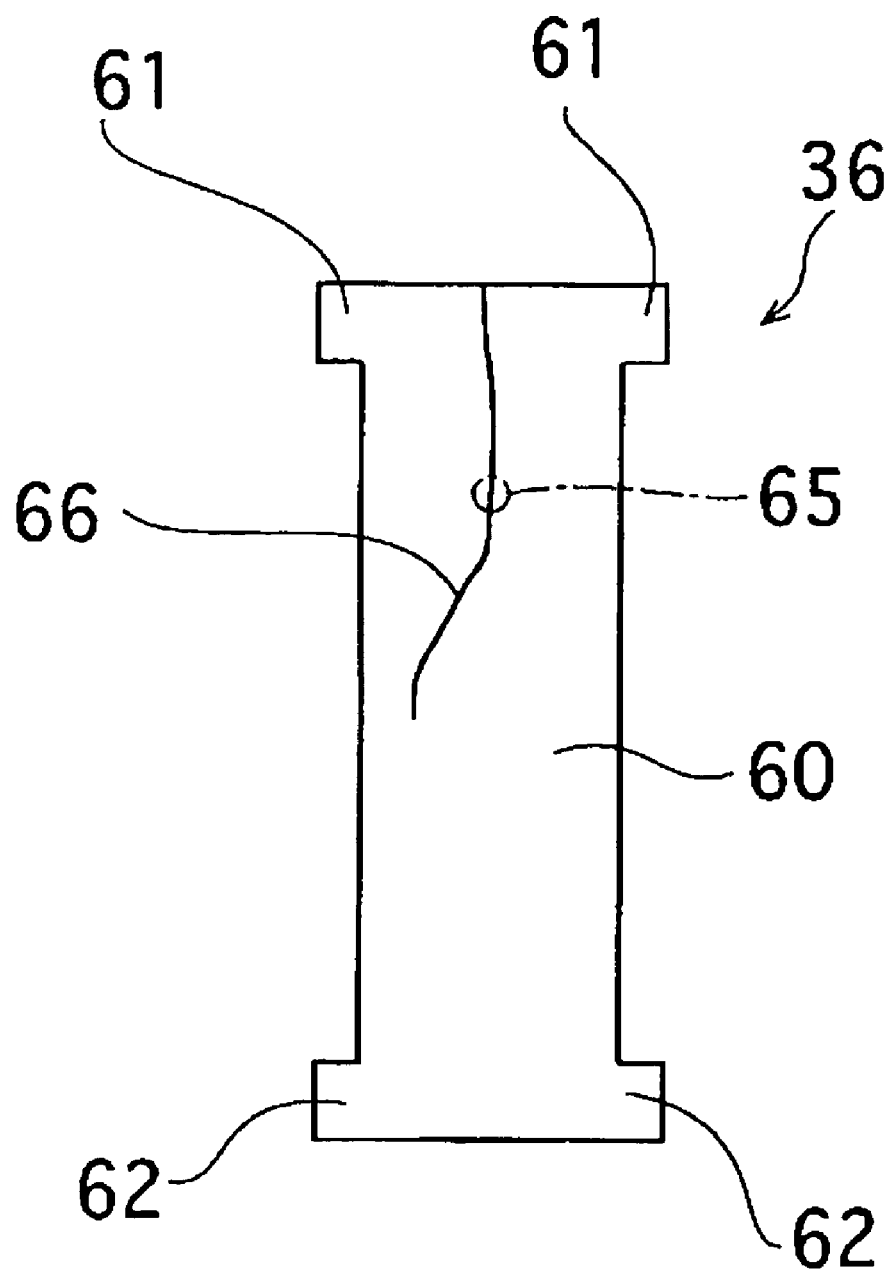
FIG. 12 is a side view describing a state of the clamper 36 which has been damaged.

In particular, since the gate position 65 for which the clamper 36 is injection molded is more thinly formed than the other areas, it is relatively weak. If the pushing jig 70 causes an excessive pushing force to act on the gate position 65, as shown in FIG. 12, a crack 66 takes place at the gate position 65. As a result, the base portion 60 may be damaged or broken.

To solve this problem, the clamper 36 is modified as described in a second embodiment that follows.

SECOND EMBODIMENT

Figure 13A:
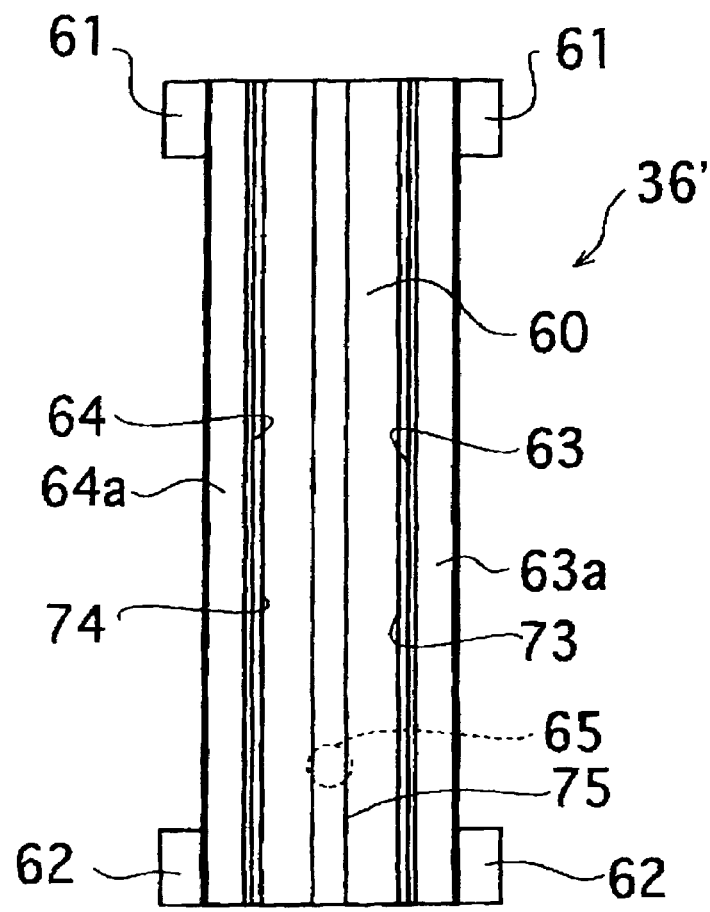
FIG. 13A and FIG. 13B are views showing a clamper 36' that composes the leader block 32 according to a second embodiment of the present invention, FIG. 13A being a side view thereof, FIG. 13B being a bottom view thereof.
Figure 13B:
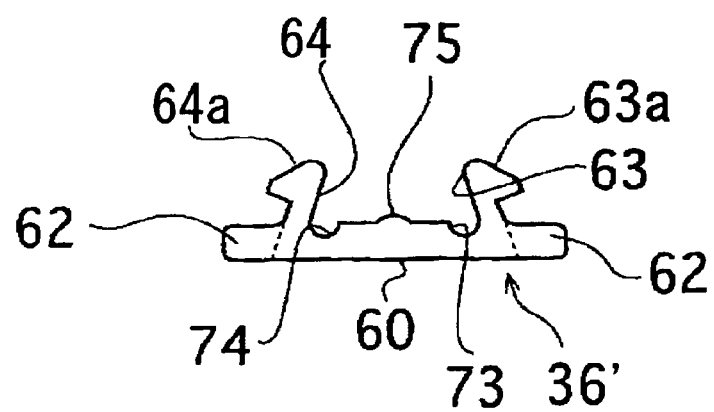
Figure 14:
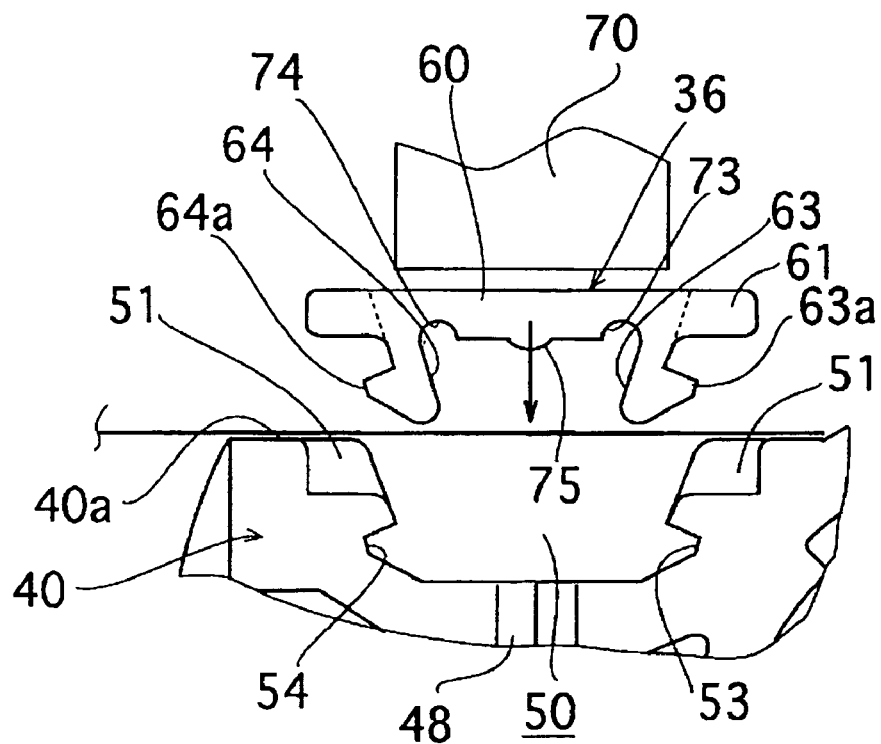
FIG. 14 is an outlined plan view describing a mounting step of the leader tape 21 and the clamper 36' to the block body 40.
Figure 15:
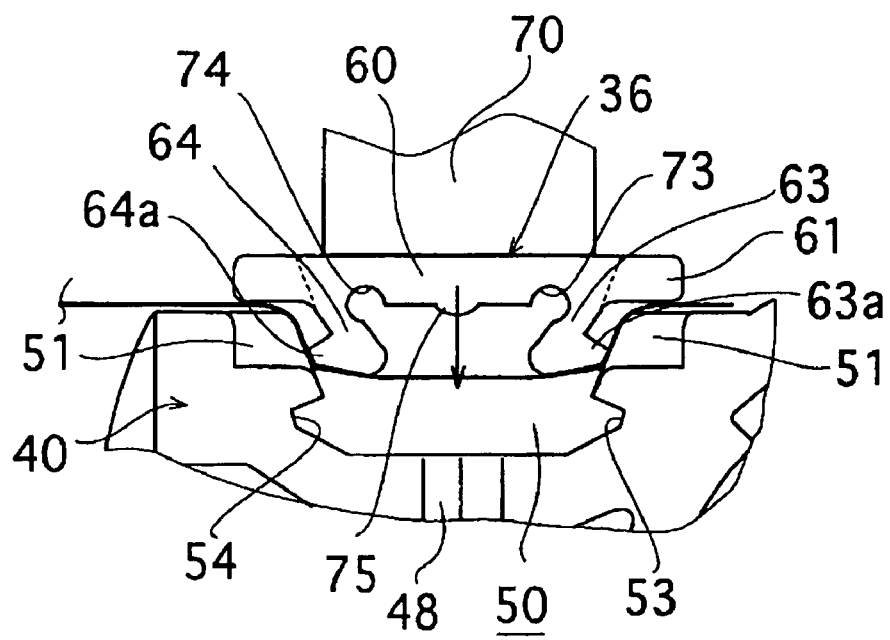
FIG. 15 is an outlined plan view describing a mounting state of the leader tape 21 and the clamper 36' to the block body 40.
Figure 16:
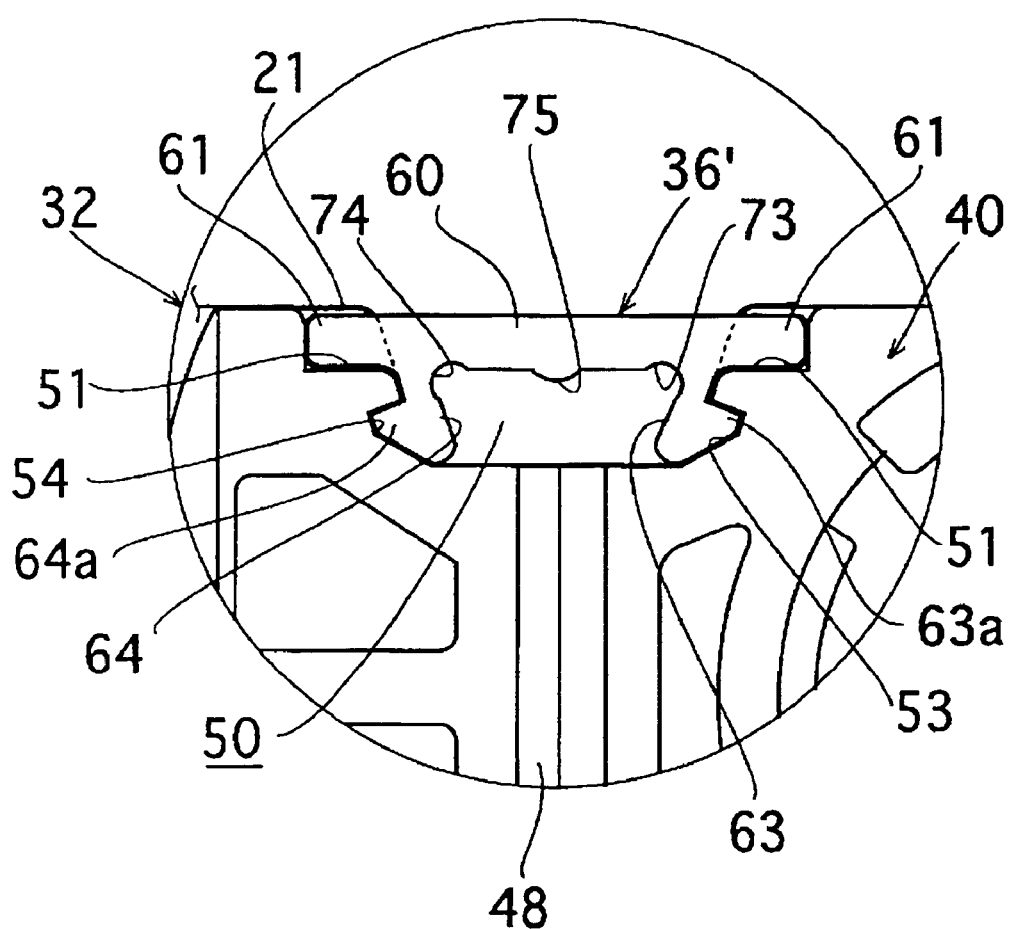
FIG. 16 is an outlined plan view showing a state of which the mounting step of the leader tape 21 and the clamper 36' to the block body 40 has been completed.

FIG. 13A to FIG. 16 show the second embodiment of the present invention. FIG. 13A is a side view showing a clamper 36', FIG. 13B being a bottom view thereof. FIG. 14 to FIG. 16 are outlined plan views describing mounting steps of the leader tape 21 and the clamper 36 to the block body 40. In these drawings, similar elements to those in the first embodiment are denoted by similar reference numerals and their detailed description are omitted.

As shown in FIG. 13A and FIG. 13B, in the clamper 36' of this embodiment, concave grooves 73 and 74 are fully formed in the elongation direction of the pair of leg portions 63 and 64 on the inner surface of the base portion 60 (namely, on the surfaces of the leg portions 63 and 64). The concave grooves 73 and 74 are continuously formed on the inner surfaces of the leg portions 63 and 64. Although the concave grooves 73 and 74 have nearly arc sections, they may have for example triangular or square sections. As long as the concave grooves 73 and 74 allow leg portions 63 and 64 to be elastically deformed so that they approach each other, the concave grooves 73 and 74 may have any sectional shapes.

In addition, a reinforcement rib 75 is disposed on the inner surface of the base portion 60 of the clamper 36' to improve the mechanical strength of the base portion 60. The reinforcement rib 75 is straightly formed in the elongation direction of the base portion 60 so that the reinforcement rib 75 passes through the position corresponding to the gate position 65 of the clamper 36'. The shape of the reinforcement rib 75 may not need to be continuous. In other words, the reinforcement rib 75 may be formed with interspersion at a plurality of positions. Alternatively, the reinforcement rib 75 may be curved on the inner surface of the base portion. The reinforcement rib 75 is integrally formed with the clamper 36' when it is produced. Of course, they may be formed as separate members.

Since the structure of other elements of the clamper 36' is the same as that of the first embodiment, their description is omitted. In addition, the structure of the block body 40 to which the clamper 36 is mounted is the same as that of the first embodiment.

At the press-fitting step of the clamper 36' to the block body 40, as shown in FIG. 14, after the leader tape 21 is aligned to the side surface portion 40a of the block body 40, the clamper 36' is positioned so that the pair of leg portions 63 and 64 of the clamper 36' face the assembling concave portion 50. With the pushing jig 70 of the automatic clamping device, the clamper 36' is press-fit to the assembling concave portion 50 through the leader tape 21.

The outer surfaces of the base portion 60 of the clamper 36' are pressed by the pushing jig 70. Thus, as shown in FIG. 15, the nail portions 63a and 64a of the pair of leg portions 63 and 64 are elastically deformed along both side wall surfaces of the assembling concave portion 50 in the direction of which the nail portions 63a and 64a approach each other. Finally, as shown in FIG. 16, the nail portions 63a and 64a are secured to the securing grooves 53 and 54 through the wide walls of the assembling concave portion 50. As a result, the connecting step for the leader block 32 and the leader tape 21 is completed.

Thus, according to this embodiment, of course, the same effect as the first embodiment can be obtained. In addition, since the concave grooves 73 and 74 are formed in the elongation direction of the inner surfaces of the leg portions 63 and 64 of the clamper 36', the leg portions 63 and 64 are highly elastically deformed in the direction of which they approach each other. As a result, the pushing force of the pushing jig 70 to the clamper 36' can be decreased in comparison with that of the first embodiment. Thus, since the pushing force that acts on the base portion 60 is decreased, it can be prevented from being damaged.

In addition, since the reinforcement rib 75 is disposed on the inner surface of the base portion 60, the mechanical strength of the base portion 60 is improved. Thus, the damage prevention effect of the base portion 60 pressed by the clamper 36' can be more improved.

Figure 17A:
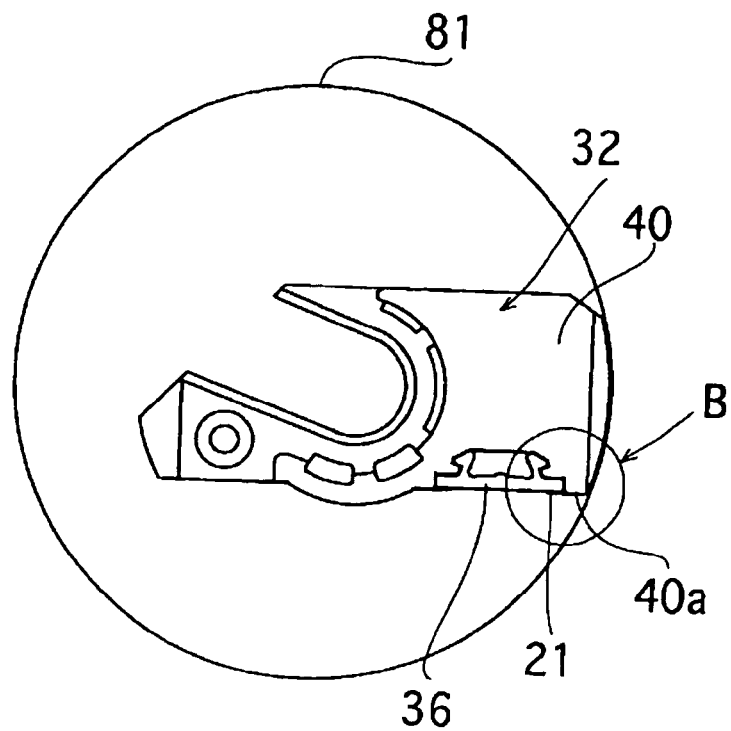
FIG. 17A and FIG. 17B are schematic diagrams showing the relationship of the leader block 32 and a take-up reel 81 disposed in the tape drive device.
Figure 17B:
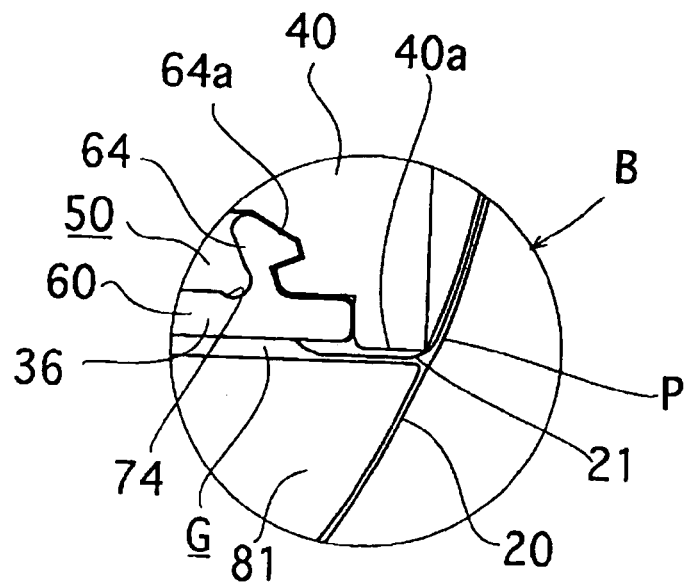

In the forgoing embodiments, the leader tape 21 exits from the side surface portion 40a of the leader block 32 (see FIG. 3, FIG. 4, FIG. 10, and FIG. 16). Thus, as schematically shown in FIG. 17A, when the leader block 32 is mounted to the take-up reel 81 in the tape drive device, as shown in FIG. 17B, the leader tape 21 sags in a gap G between the leader block 32 and the take-up reel 81. As a result, the leader tape 21 is wound to the periphery of the take-up reel 81 and the rear end of the leader block 32, which forms a part of the periphery of the take-up reel 81.

Figure 18A:
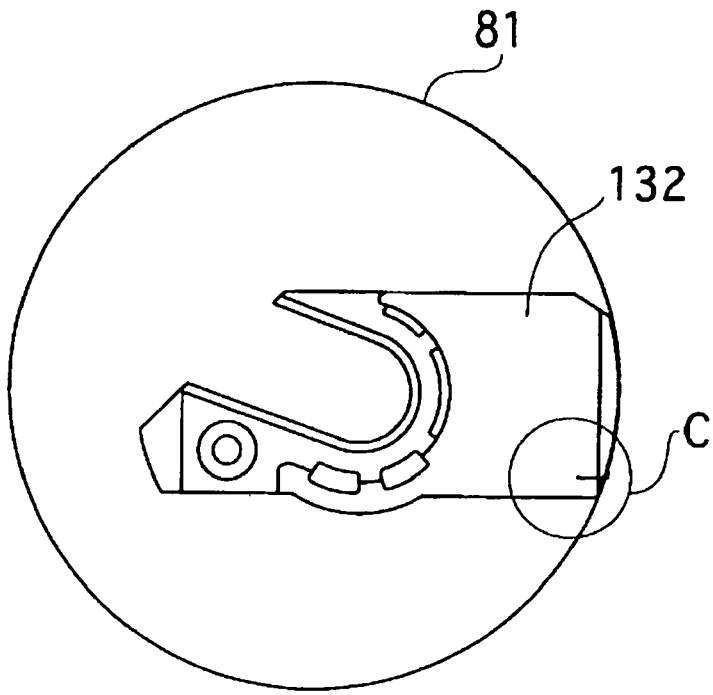
FIG. 18A and FIG. 18B are schematic diagram showing the relationship of the leader block 32 and a take-up reel 81 disposed in the tape drive device.
Figure 18B:
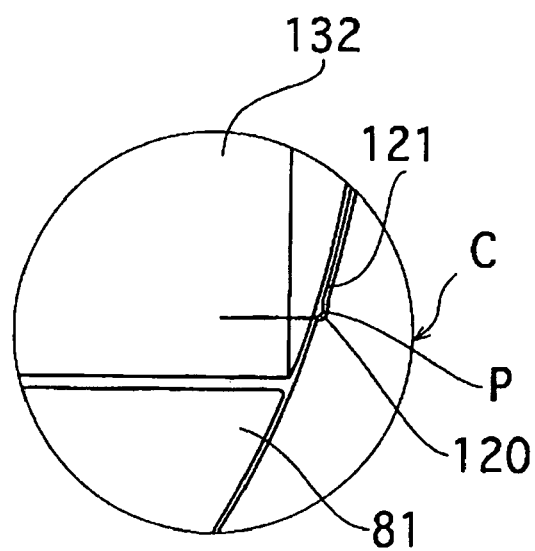
Figure 19A:
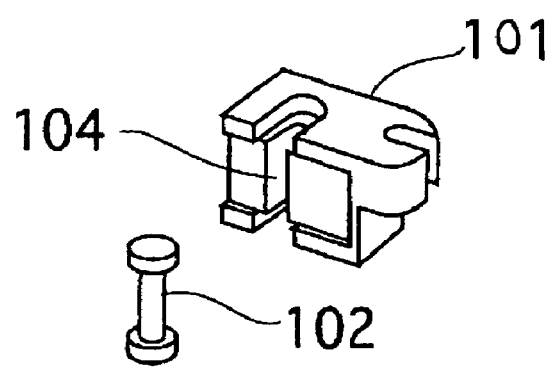
FIG. 19A and FIG. 19B are schematic diagrams showing a structure of a leader block of a conventional tape cartridge.
Figure 19B:
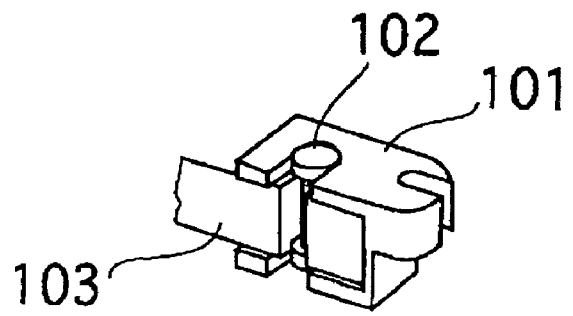
Figure 20A:
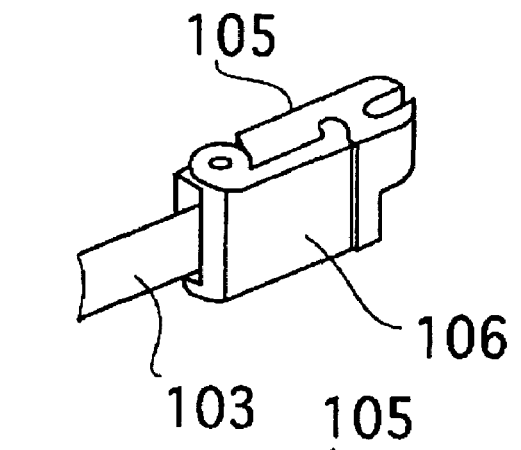
FIG. 20A and FIG. 20B are schematic diagrams showing another structure of the leader block of the conventional tape cartridge.
Figure 20B:
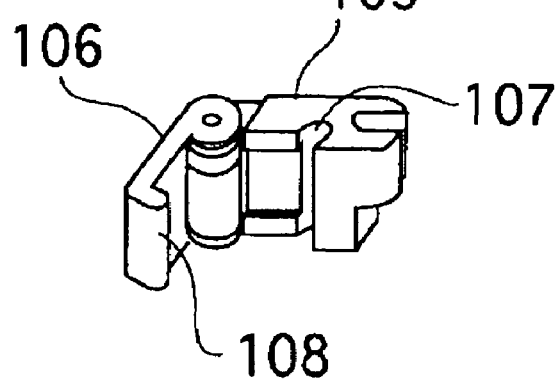

As a comparison, FIG. 18A shows a structure of which a leader tape 121 exits from the rear end surface of a leader block 132. In this example, as shown in FIG. 18B, the leader tape 121 is bent and wound around the take-up reel 81 from the rear end surface of the leader block 132. Thus, on the magnetic tape 120 that is repeatedly wound on the take-up reel 81, it is quite likely that a pit impression takes place in a ridged portion P formed nearly at the bend point of the leader tape 121.

In contrast, according to the present invention, since the leader tape 21 exits from the side surface portion of the leader block 32, as shown in FIG. 17B, the ridged portion P formed near the bend portion of the leader tape 21 guided from the gap G to the rear end surface of the leader block 32 is smaller than that shown in FIG. 18B. Thus, damages of the magnetic tape 20 can be minimized.

It should be understood by those skilled in the art that various modifications may occur within the scope of the present invention.

For example, according to the second embodiment, the concave grooves 73 and 74, and the reinforcement rib 75 are added to the base portion 60 to form the clamper 36'. Alternatively, one of them may be added.

INDUSTRIAL APPLICABILITY

As described above, in the tape cartridges of the present invention, nail portions formed on the outer surfaces of a pair of leg portions of a clamp member are secured to securing grooves formed in concave side walls of a concave portion of a block body to secure the block body and the clamp member. Thus, the clamp force of the leader block to the tape can be prevented from lowering. With a desired clamp force, the tape can be secured to the leader block.

In addition, concave grooves are formed in an inner surface of a base portion of a clamp member in the elongation direction of a pair of leg portions. Thus, when nail portions on the outer surfaces of the leg portions are secured to the securing grooves, the leg portions can be more elastically deformed. As a result, when the clamp member is pressed, it can be prevented from being damaged.

The invention claim is:

1. A tape cartridge including a cartridge case having a tape exit opening portion formed by connecting an upper shell and a lower shell, a tape reel rotatably housed in said cartridge case, and a leader block connected to one end of a tape wound around said tape reel;

said leader block having a block body, and a clamp member that is press-fit to a concave portion formed on a side surface portion of the block body and that nips the end of said tape with said block body;

said tape cartridge characterized in that:

said clamp member comprises:

a base portion that is press-fit to said concave portion to form a part of the side surface portion of said block body;

a pair of leg portions that are formed on inner surface sides of said base portion in the direction of the width of said tape; and nail portions that are formed on outer surface sides of said pair of leg portions and that are secured to securing grooves formed in side walls of said concave portion, wherein said concave portion is formed in all the height direction of said leader block, and a restriction portion is disposed on the side surface portion of said block body, the restriction portion restricting being fit to said clamp member to restrict upper and lower movements of said clamp member, and wherein a guide portion is disposed at an opening portion of said concave portion, the guide portion being brought into contact with a side end portion of said tape to align said tape and said block body.

2. The tape cartridge as set forth in claim 1, wherein the length of said pair of leg portions is larger than the width of said tape.

3. The tape cartridge as set forth in claim 1, wherein concave grooves are formed on an inner surface side of said base portion in all the elongation region of said pair of leg portions.

4. The tape cartridge as set forth in claim 1, wherein a reinforcement rib is disposed on the inner surface side of said base portion.

5. The tape cartridge as set forth in claim 1, wherein said tape exits from a side of said leader block.

* * * * *